US011262727B2

(12) United States Patent
Inoue

(10) Patent No.: US 11,262,727 B2
(45) Date of Patent: Mar. 1, 2022

(54) INTEGRATED SIMULATION SYSTEM HAVING IMPROVED OPERABILITY

(71) Applicant: FANUC CORPORATION, Yamanashi (JP)

(72) Inventor: Kozo Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 105 days.

(21) Appl. No.: 16/296,567

(22) Filed: Mar. 8, 2019

(65) Prior Publication Data
US 2019/0302733 A1 Oct. 3, 2019

(30) Foreign Application Priority Data
Mar. 27, 2018 (JP) .............................. JP2018-060160

(51) Int. Cl.
*G05B 19/4068* (2006.01)
*G05B 19/418* (2006.01)
(52) U.S. Cl.
CPC ... *G05B 19/4068* (2013.01); *G05B 19/41825* (2013.01); *G05B 2219/35318* (2013.01); *G05B 2219/45213* (2013.01)
(58) Field of Classification Search
CPC .......... G05B 19/4068; G05B 19/41825; G05B 2219/45213; G05B 2219/35318
See application file for complete search history.

(56) References Cited

U.S. PATENT DOCUMENTS

| 4,633,385 | A  | * | 12/1986 | Murata | ............ | G05B 19/41815 |
|---|---|---|---|---|---|---|
| | | | | | | 700/86 |
| 6,456,996 | B1 | * | 9/2002 | Crawford, Jr | ......... | G06Q 10/06 |
| 10,192,195 | B1 | * | 1/2019 | Brazeau | ............... | G06Q 10/087 |
| 2003/0090490 | A1 | * | 5/2003 | Watanabe | .............. | B25J 9/1671 |
| | | | | | | 345/473 |

(Continued)

FOREIGN PATENT DOCUMENTS

| CN | 1945478 A | 4/2007 |
|---|---|---|
| CN | 101479734 A | 7/2009 |

(Continued)

OTHER PUBLICATIONS

D. Richard Kuhn et al., "Combinatorial methods for event sequence testing," 2012, 2012 IEEE Fifth International Conference on Software Testing, Verification and Validation, 9 pages (Year: 2012).*

(Continued)

*Primary Examiner* — Kamini S Shah
*Assistant Examiner* — Russ Guill
(74) *Attorney, Agent, or Firm* — Hauptman Ham, LLP

(57) ABSTRACT

An integrated simulation system includes a first simulation device which executes a simulation of a first program, a second simulation device which executes a simulation of a second program, a start timing setting section which sets start timing for the correlated first program and second program so as to verify the presence or absence of malfunctions caused by a start order of the correlated first program and second program, and a program starting section which issues commands to the first simulation device and the second simulation device to start the correlated first program and second program at the set start timing by a single starting operation.

8 Claims, 6 Drawing Sheets

(56) References Cited

U.S. PATENT DOCUMENTS

| | | | | |
|---|---|---|---|---|
| 2004/0030453 | A1* | 2/2004 | Graf | G05B 19/41825 |
| | | | | 700/245 |
| 2008/0216077 | A1* | 9/2008 | Emani | G05B 19/41865 |
| | | | | 718/102 |
| 2008/0241969 | A1* | 10/2008 | Winkler | G03F 7/70525 |
| | | | | 438/5 |
| 2010/0153073 | A1* | 6/2010 | Nagatsuka | G05B 19/4069 |
| | | | | 703/1 |
| 2014/0364989 | A1* | 12/2014 | Hosaka | G05B 19/41825 |
| | | | | 700/159 |
| 2015/0046906 | A1* | 2/2015 | Segall | G06F 11/3676 |
| | | | | 717/124 |
| 2016/0075019 | A1* | 3/2016 | Tabuchi | G05B 19/41865 |
| | | | | 700/252 |

FOREIGN PATENT DOCUMENTS

| | | |
|---|---|---|
| CN | 101751004 A | 6/2010 |
| JP | H6-79591 A | 3/1994 |
| JP | 200970181 A | 4/2009 |
| JP | 4653836 B2 | 3/2011 |
| JP | 2014241018 A | 12/2014 |
| JP | 5752179 B2 | 7/2015 |

OTHER PUBLICATIONS

S. Akella et al., "Coordinating the motions of multiple robots with specified trajectories," 2002, Proceedings 2002 IEEE International Conference on Robotics and Automation, 8 pages (Year: 2002).*

Joakim Ejenstam, "Implementing a time optimal task sequence for robot assembly using constraint programming," 2014, Uppsala University, 62 pages (Year: 2014).*

Xu Wang et al., "Collision avoidance of mobile robots by using initial time delays," 2015, 2015 IEEE 54th Annual Conference on Decision and Control, pp. 324-329 (Year: 2015).*

B.H. Lee et al., "Collision-free motion planning of two robots," 1987, IEEE Transactions on Systems, Man, and Cybernetics, vol. smc-17, No. 1, 12 pages (Year: 1987).*

D. Richard Kuhn et al., "Combinatorial testing theory and practice,"2015, Advances in Computers, Jan. 2015, 53 pages (Year: 2015).*

* cited by examiner

FIG. 2

CORRELATION DATA 90     91     81

| CORRELATION NUMBER | FIRST PROGRAM NAME | SECOND PROGRAM NAME | THIRD PROGRAM NAME |
|---|---|---|---|
| 1 | ROBOT PROGRAM a | CNC PROGRAM a | CNC PROGRAM e |
| 2 | ROBOT PROGRAM b | CNC PROGRAM b | CNC PROGRAM f |
| 3 | ROBOT PROGRAM c | CNC PROGRAM c | CNC PROGRAM g |
| 4 | ROBOT PROGRAM d | CNC PROGRAM d | CNC PROGRAM h |
| ... | ... | ... | ... |

FIG. 3A

START TIMING

| CORRELATION NO. | FIRST PROGRAM START ORDER | SECOND PROGRAM START ORDER | THIRD PROGRAM START ORDER |
|---|---|---|---|
| 1 | FIRST | SECOND | THIRD |
| 1 | SECOND | FIRST | THIRD |
| 1 | THIRD | SECOND | FIRST |
| 1 | FIRST | FIRST | FIRST |
| ... | ... | ... | ... |

FIG. 3B

START TIMING

| CORRELATION NO. | FIRST PROGRAM START TIME | SECOND PROGRAM START TIME | THIRD PROGRAM START TIME |
|---|---|---|---|
| 1 | 20 SECONDS PRIOR | 0 SECONDS | 5 MINUTES LATER |
| 1 | 0 SECONDS | 10 SECOND PRIOR | 5 MINUTES LATER |
| 1 | 5 MINUTES PRIOR | 0 SECONDS | 20 SECONDS LATER |
| 1 | 0 SECONDS | 0 SECONDS | 0 SECONDS |
| ... | ... | ... | ... |

FIG. 4A

STOP TIMING SETTING

| CORRELATION NO. | FIRST PROGRAM STOP ORDER | SECOND PROGRAM STOP ORDER | THIRD PROGRAM STOP ORDER |
|---|---|---|---|
| 1 | FIRST | FIRST | FIRST |
| 1 | THIRD | SECOND | FIRST |
| 1 | SECOND | THIRD | FIRST |
| 1 | SECOND | FIRST | THIRD |
| ... | ... | ... | ... |

FIG. 4B

STOP TIMING SETTING

| CORRELATION NO. | FIRST PROGRAM STOP TIME | SECOND PROGRAM STOP TIME | THIRD PROGRAM STOP TIME |
|---|---|---|---|
| 1 | 0 SECONDS | 0 SECONDS | 0 SECONDS |
| 1 | 5 MINUTES LATER | 10 SECONDS LATER | 0 SECONDS |
| 1 | 30 SECONDS LATER | 5 MINUTES LATER | 0 SECONDS |
| 1 | 20 SECONDS LATER | 0 SECONDS | 5 MINUTES LATER |
| ... | ... | ... | ... |

FIG. 5

PARAMETER SETTINGS

| CORRELATION NO. | FIRST PROGRAM PARAMETER SETTINGS | SECOND PROGRAM PARAMETER SETTINGS | THIRD PROGRAM PARAMETER SETTINGS |
|---|---|---|---|
| 1 | PARAMETER SETTING a | PARAMETER SETTING e | PARAMETER SETTING h |
| 1 | PARAMETER SETTING b | PARAMETER SETTING e | PARAMETER SETTING i |
| 1 | PARAMETER SETTING c | PARAMETER SETTING f | PARAMETER SETTING i |
| 1 | PARAMETER SETTING d | PARAMETER SETTING g | PARAMETER SETTING j |
| ... | ... | ... | ... |

INTEGRATED SIMULATION SYSTEM HAVING IMPROVED OPERABILITY

RELATED APPLICATIONS

The present application claims priority of Japanese Application Number 2018-060160, filed on Mar. 27, 2018, the disclosure of which is hereby incorporated by reference herein in its entirety.

BACKGROUND OF THE INVENTION

1. Field of the Invention

The present invention relates to an integrated simulation system having improved operability, and in particular, relates to an integrated simulation system for verifying the presence or absence of malfunctions caused by the operation order of a plurality of programs.

2. Description of Prior Art

In conventional integrated simulation systems comprising a simulation device for performing simulation of the motion of a robot and a simulation device for performing simulation of the motion of a machine tool performing an operation in cooperation with the robot, it is necessary to select a robot program and machine tool program for each simulation device and start the robot program and the machine tool program using individual operation means.

The documents described below are known as prior art related to the present application. Japanese Patent No. 4653836 discloses a simulation device capable of displaying a three-dimensional model of a first operation machine and a second operation machine of different operation machines, such as robots and machine tools, in different simulation software on a display device as if the elapsed times thereof match, even if the elapsed times thereof do not match. However, starting and stopping the different programs in different simulation devices by a single operation is not suggested.

Though not a simulation device, Japanese Patent No. 5752179 discloses a controller capable of controlling the cooperative motion of a machine tool and a robot using only a single processing program without using a ladder program. When such an invention is applied to an integrated simulation system, though operability is improved, it is not possible to verify malfunctions caused by the start order or the stop order of the different programs.

Japanese Unexamined Patent Publication (Kokai) No. 6-79591 discloses an automatic machining device comprising a compound-machining machine tool and a conveyance device that conveys an arrangement member or workpiece to the compound-machining machine tool, wherein the automatic machining device executes an automatic machining simulation based on a machining schedule of the workpiece and an arrangement schedule, and displays deficient members which are deficient due to arrangement errors or the like on a screen. However, different programs on different simulation devices cannot be started and stopped with a single operation and in a desired order.

SUMMARY OF THE INVENTION

In simulation operations in which starting and stopping are repeated many times, the operations of selecting different programs with different simulation devices and starting and stopping different programs using individual operation means causes a decrease in operation efficiency.

Though the cooperative motion between a robot program and a machine tool program can be realized by exchanging (i.e., handshaking) a motion command signal and motion completion signal via a ladder program or between both programs directly, there is a risk that incorrect handshaking may occur due to the start order or stop order of each program, causing malfunctions.

Further, in multi-product small-volume production cells where a plurality of machine tools and a plurality of robots move cooperatively, since the number of programs is large and the frequency of changes in specification is high, collective verification of not only the presence or absence of malfunctions caused by the operation order of these programs but also various parameter settings is desired.

Thus, an integrated simulation technology having improved operability has been demanded.

A first aspect of the present disclosure provides an integrated simulation system including a first simulation device which executes a simulation of a first program describing a command for a first machine, a second simulation device which executes a simulation of a second program describing a command for a second machine which performs an operation in cooperation with the first machine, a data acquisition section which acquires data related to the first program and the second program, a data correlation section which correlates the first program and the second program based on the acquired data, a start timing setting section which sets start timing for the correlated first program and second program so as to verify the presence or absence of malfunctions caused by a start order of the correlated first program and second program, and a program starting section which issues commands to the first simulation device and the second simulation device to start the correlated first program and second program at the set start timing by a single starting operation.

BRIEF DESCRIPTION OF THE DRAWINGS

FIG. 2 is a view showing correlation data correlated with respective programs according to the embodiment.

FIG. 3A is a view showing start timing (start order) according to the embodiment.

FIG. 3B is a view showing start timing (start time) according to another embodiment.

FIG. 4A is a view showing stop timing (stop order) according to the embodiment.

FIG. 4B is a view showing stop timing (stop time) according to the other embodiment.

FIG. 5 is a view showing parameter settings according to the embodiment.

DETAILED DESCRIPTION

Figure 1:
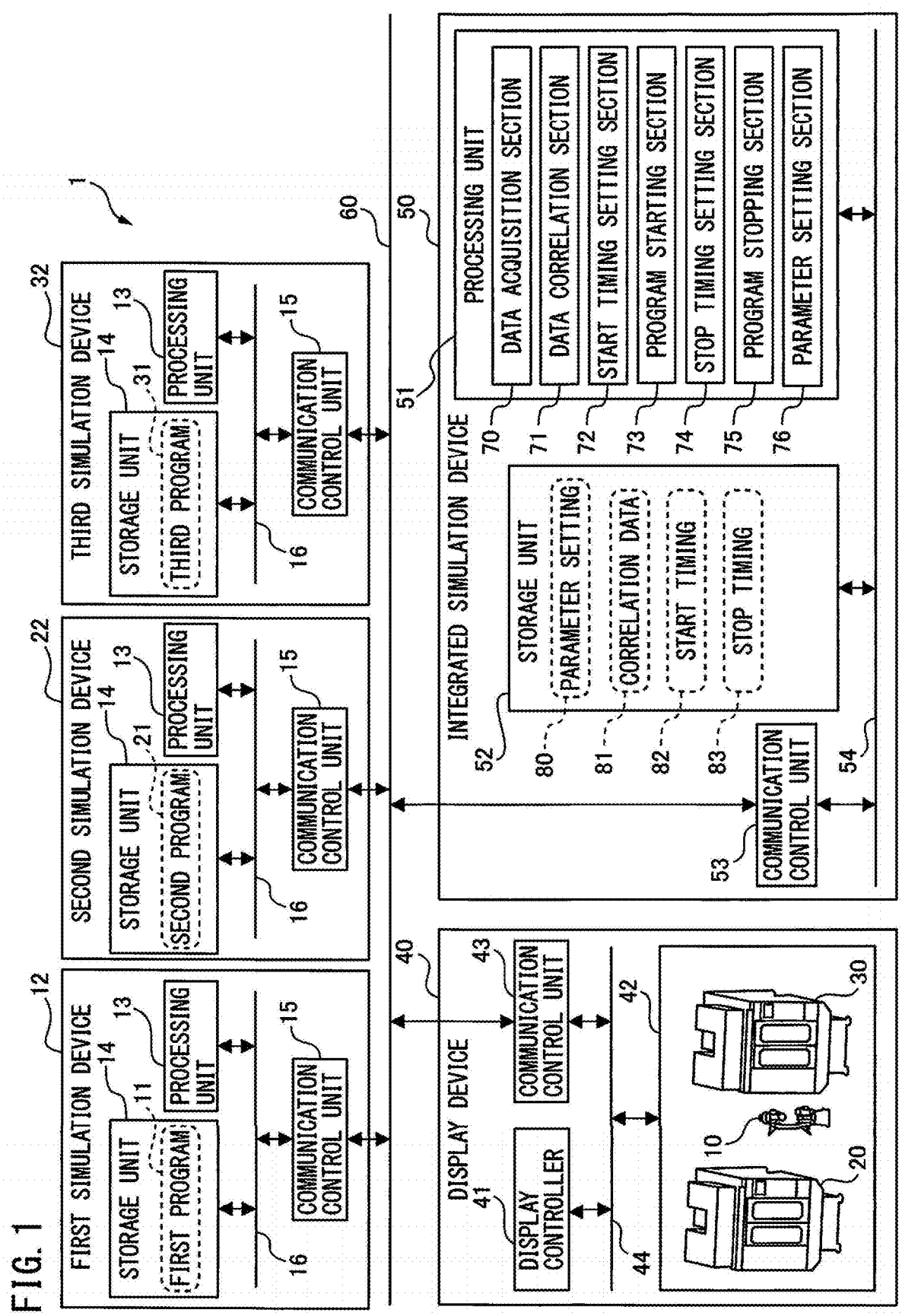
FIG. 1 is a block diagram showing an integrated simulation system according to an embodiment.

The embodiments of the present disclosure will be described in detail below with reference to the attached drawings. In the drawings, the same or equivalent constituent elements are assigned the same or equivalent reference numerals. Furthermore, the embodiments described below do not limit the technical scope of the inventions described in the claims or the meanings of the terms described therein.

FIG. 1 is a block diagram showing an integrated simulation system 1 according to the present embodiment. As shown in FIG. 1, the integrated simulation system 1 comprises a first simulation device 12 which executes a simulation of a first program 11 describing a command for a robot 10, a second simulation device 22 which executes a simulation of a second program 21 describing a command for a machine tool 20 which performs an operation in cooperation with the robot 10, and a third simulation device 32 which executes a simulation of a third program 31 describing a command for a machine tool 30 which performs an operation in cooperation with the robot 10 and the machine tool 20.

The integrated simulation system 1 further comprises a display device 40 which displays, in a virtual space, an integration of the respective simulations executed by the first simulation device 12, the second simulation device 22, and the third simulation device 32, and an integrated simulation device 50 which manages the first simulation device 12, the second simulation device 22, and the third simulation device 32.

The first simulation device 12, the second simulation device 22, the third simulation device 32, the display device 40, and the integrated simulation device 50 are communicatively connected to each other via a wired or wireless network 60. In another embodiment, a configuration of the integrated simulation system 1 in which an integrated simulation device 50 is not included may be adopted by providing the function of the integrated simulation device 50 to the first simulation device 12, the second simulation device 22, or the third simulation device 32.

The first simulation device 12, second simulation device 22, and third simulation device 32 are known computers, and comprise processing units 13, storage units 14 which stores the simulation target programs, and communication control units 15. The processing units 13, storage units 14, and communication control units 15 are connected to each other via buses 16. The display device 40 is a known monitor, and comprises a display controller 41, a display unit 42, and a communication control unit 43. The display controller 41, display unit 42, and communication control unit 43 are connected to each other via a bus 44. The integrated simulation device 50 is a known computer and comprises a processing unit 51, a storage unit 52, and a communication control unit 53. The processing unit 51, storage unit 52, and communication control unit 53 are connected to each other via a bus 54.

The processing unit 51 comprises a data acquisition section 70 which acquires data related to the first program 11, second program 21, and third program 31 from the first simulation device 12, the second simulation device 22, and the third simulation device 32. Such data includes program names, program storage locations, and the parameter settings 80 used. The parameter settings 80 are stored in the storage unit 52.

The processing unit 51 further comprises a data correlation section 71 which correlates the first program 11, the second program 21, and the third program 31 based on data acquired from the first simulation device 12, the second simulation device 22, and the third simulation device 32. The correlated correlation data 81 is stored in the storage unit 52. The data correlation section 71 may correlate a plurality of types of parameter settings 80 with the correlated first program 11, second program 21, and third program 31. As a result, a plurality of parameter settings can be collectively verified.

The processing unit 51 further comprises a start timing setting section 72 which sets one or a plurality of start timings 82 for the correlated first program 11, second program 21, and third program 31 so as to verify the presence or absence of malfunctions due to the start order of the correlated first program 11, second program 21, and third program 31. The set start timing 82 is stored in the storage unit 52.

The processing unit 51 further comprises a program starting section 73 which issues commands to the first simulation device 12, the second simulation device 22, and the third simulation device 32 to start the correlated first program 11, second program 21, and third program 31 at the set start timing 82 by a single starting operation. When there are a plurality of set start timings 82, the program starting section 73 may issue commands to the first simulation device 12, the second simulation device 22, and the third simulation device 32 to start the correlated first program 11, second program 21, and third program 31 at the plurality of start timings 82 by a single starting operation. Furthermore, when there are a plurality of set parameter settings 80, the program starting section 73 may issue commands to the first simulation device 11, second simulation device 21, and third simulation device 31 to start the correlated first program 11, second program 21, and third program 31 by a single starting operation using the plurality of set parameter settings 80.

The processing unit 51 further comprises a stop timing setting section 74 which sets one or a plurality of stop timings 83 for the correlated first program 11, second program 21, and third program 31 so as to verify the presence or absence of malfunctions caused by the stop order of the correlated first program 11, second program 21, and third program 31. The set stop timing 83 is stored in the storage unit 52.

The processing unit 51 further comprises a program stopping section 75 which issues commands to the first simulation device 12, the second simulation device 22, and third simulation device 32 to stop the first program 11, second program 21, and third program 31 during execution at one or a plurality of set stop timings 83 by a single stopping operation or a single alarm.

The processing unit 51 may further comprise a parameter setting section 76 which sets one or a plurality of parameter settings for the correlated first program 11, second program 21, and third program 31. In this embodiment, the program starting section 73 starts the correlated first program 11, second program 21, and third program 31 using one or a plurality of set parameter settings by a single starting operation. The set parameter settings 80 are stored in the storage unit 52.

FIG. 2 is a view showing correlated correlation data 81 of the respective programs according to the present embodiment. Note that though the correlation data 81 includes correlation numbers 90 and respective program names 91 (e.g., robot program a, CNC program a, and CNC program e), the correlation data 81 is not limited thereto. Program storage locations, parameter settings and the like may be included therein.

FIG. 3A is a view showing the start timing 82 (start order) according to the present embodiment. The start timing 82 includes correlation numbers 90 and start orders 92 of the respective programs. One or a plurality of start orders 92 can be set for a single correlation number 90. For example, the operator can verify the presence or absence of malfunctions due to the start order of the programs by setting the start order of the first program, second program, and third program to the correct order (first, second, and third) and an incorrect order (second, first, and third).

FIG. 3B shows the start timing 82 (start time) according to another embodiment. The start timing 82 includes correlation numbers 90 and the start times 93 of the respective programs. One or a plurality of start times 93 can be set for a single correlation number 90. For example, the operator can verify the presence or absence of malfunctions due to the start order of the programs by setting the start times of the first program, second program, and third program to the correct times (20 seconds prior, 0 seconds, 5 minutes later) and the incorrect times (0 seconds, 10 seconds prior, 5 minutes later).

FIG. 4A shows the stop timing 83 (stop order) according to the present embodiment. The stop timing 83 includes correlation numbers 90 and the stop orders 94 of the respective programs. One or a plurality of stop orders 94 can be set for a single correlation number 90. For example, the operator can verify the presence or absence of malfunctions due to the stop order of the programs by setting the stop order of the first program, second program, and third program to the correct order (first, first, and first) and the incorrect order (third, second, first).

FIG. B shows the stop timing 83 (stop time) according to another embodiment. The stop timing 83 includes correlation numbers 90 and stop times 95 of the respective programs. One or a plurality of stop times 95 can be set for a single correlation number 90. For example, the operator can verify the presence or absence of malfunctions due to the stop order of the programs by setting the stop times of the first program, second program, and third program to the correct times (0 second, 0 seconds, and 0 seconds), and the incorrect times (5 minutes later, 10 seconds later, and 0 seconds).

FIG. 5 is a view showing the parameter settings 80 according to the present embodiment. The parameter settings 80 may include correlation numbers 90 and the parameter settings 80 of the respective programs. One type or a plurality of types of parameter settings 80 can be set for a single correlation number 90. For example, the operator can collectively verify the parameter settings of the programs by setting the parameter settings of the first program, second program, and third program to a first choice of parameter settings (parameter setting a, parameter setting e, and parameter setting h) and a second choice of parameter settings (parameter setting b, parameter setting e, and parameter setting i).

Figure 6:
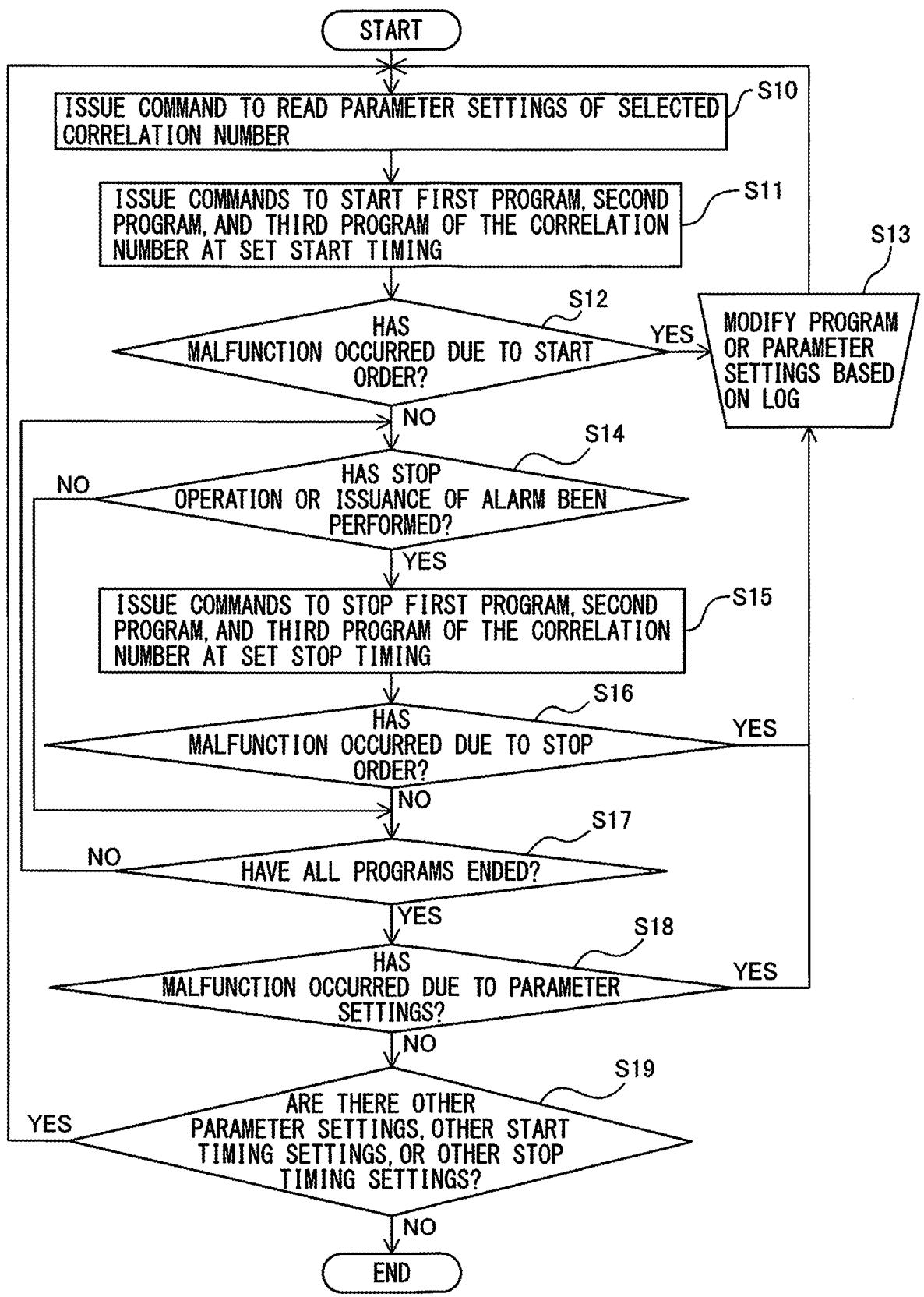
FIG. 6 is a flowchart showing a method for the control of the integrated simulation system according to the embodiment.

FIG. 6 is a flowchart showing a method for controlling the integrated simulation system 1 according to the present embodiment. Though such flowchart is executed by the processing unit 51 of the integrated simulation device 50 shown in FIG. 1 in the present embodiment, in another embodiment in which an integrated simulation device 50 is not included, the flowchart may be executed by the processing unit 13 of the first simulation device 12, second simulation device 22, or third simulation device 32 shown in FIG. 1.

When the integrated simulation system 1 starts the simulation, in step S10, the processing unit 51 issues commands to the first simulation device 12, the second simulation device 22, and the third simulation device 32 to read the parameter settings 80 of the correlation number selected by the operator. In step S11, the processing unit 51 issues commands to the first simulation device 12, second simulation device 22, and third simulation device 32 to start the first program 11, second program 21, and third program 31 of the correlation number at the set start timing 82 by a single starting operation.

In step S12, the operator verifies whether or not a malfunction has occurred due to the start order by monitoring the motion of the robot 10, the motion of the machine tool 20, and the motion of the machine tool 30 displayed in virtual space on the display device 40. When a malfunction has occurred due to the start order (YES in step S12), in step S13, the operator temporarily stops (such temporary stoppage does not stop the programs at the set stop timing 83; the same is true hereinafter) the simulation and modifies the programs based on a log. Conversely, when it is determined that no malfunctions have occurred due to the start order (NO in step S12), the process proceeds to step S14.

In step S14, the processing unit 51 determines whether or not a stopping operation or the issuance of an alarm has been performed by the operator. When a stopping order or alarm has been issued (YES in step S14), in step S15, the processing unit 51 issues commands to the first simulation device 12, second simulation device 22, and third simulation device 32 to stop the first program 11, second program 21, and third program 31 during execution at the set stop timing 83 by a single stopping operation or a single alarm.

In step S16, the operator verifies whether or not a malfunction has occurred due to the stop order by monitoring the motion of the robot 10, the motion of the machine tool 20, and the motion of the machine tool 30 displayed in the virtual space on the display device 40. When a malfunction has occurred due to the stop order (YES in stop S16), in step S13, the operator temporarily stops the simulation and corrects the programs based on a log. Conversely, when no malfunctions have occurred due to the stop order (NO in step S16), the process proceeds to step S17. Furthermore, when no stopping operation or no issuance of alarms has been performed in step S14 (NO in step S14), the process proceeds to step S17.

In step S17, the processing unit 51 determines whether or not all of the programs have ended. When all of the programs have not ended (NO in step S17), the process returns to step S14, and the processing unit 51 repeats the process of determining whether or not a stopping operation or the issuance of an alarm has been performed by the operator. Conversely, when all of the programs have ended (YES in step S17), in step S18, the operator verifies whether or not a malfunction has occurred due to the parameter settings 80.

When a malfunction has occurred due to the parameter settings 80 (YES in step S18), in step S13, the operator temporarily stops the simulation and corrects the parameter settings based on a log. Conversely, when no malfunctions have occurred due to the parameter settings 80 (NO in step S18), in step S19, the processing unit 51 determines whether or not there are other parameter settings 80, other start timings 82, or other stop timings 83 for this correlation number.

When there are other parameter settings 80, other start timings 82, or other stop timings 83 for this correlation number (YES in step S19), the process returns to the first step S10, and the processing unit 51 again starts the simulation based on the other parameter settings 80, the other start timing 82, or the other stop timing 83. As a result, a plurality of types of parameter settings 80, a plurality of start timings 82, and a plurality of stop timings 83 for the correlated first program 11, second program 21, and third program 21 can be collectively verified by a single starting operation, whereby repetition of the starting operation is further reduced. When there are no other parameter settings 80, other start timings 82, or other stop timings 83 for this correlation number (NO in step S19), the simulation ends.

According to the present disclosure, since the correlated first program 11, second program 21, and third program 31 can be started or stopped at a set start timing 82 or stop timing 83 by a single starting operation, single stopping operation, or a single alarm, the presence or absence of malfunctions due to the start order or stop order of a plurality of programs can be verified while improving operability. Furthermore, a plurality of types of parameter settings 80, a plurality of start timings 82, and a plurality of stop timings 83 for the correlated first program 11, second program 21, and third program 31 can be collectively verified by a single starting operation, whereby repetition of the starting operation can be further reduced.

The invention claimed is:

1. An integrated simulation system, comprising:
   a first simulation device configured to execute a simulation of a first program describing a command for a first machine,
   a second simulation device configured to execute a simulation of a second program describing a command for a second machine which performs an operation in cooperation with the first machine, and
   a processor configured to
     acquire data related to the first program and the second program,
     correlate the first program and the second program based on the acquired data,
     set start timing for the correlated first program and second program so as to verify presence or absence of malfunctions caused by a start order of the correlated first program and second program, and
     issue commands to the first simulation device and the second simulation device to start the correlated first program and second program at the set start timing by a single starting operation,
   wherein the set start timing includes
     a correct start order and an incorrect start order of the first program and second program, or
     a correct start time and an incorrect start time of the first program and second program, and
     the set start timing is simulated by the single starting operation.

2. The integrated simulation system according to claim 1, wherein
   the processor is configured to
     set stop timing for the correlated first program and second program so as to verify the presence or absence of malfunctions caused by a stop order of the correlated first program and second program, and
     issue commands to the first simulation device and the second simulation device to stop the first program and the second program during execution at the set stop timing by a single stopping operation or a single alarm, and
   the set stop timing includes
     a correct stop order and an incorrect stop order of the first program and second program, or
     a correct stop time and an incorrect stop time of the first program and second program, and
     the set stop timing is simulated by the single stopping operation or the single alarm.

3. The integrated simulation system according to claim 2, wherein
   the processor is configured to set a plurality of stop timings for the correlated first program and second program.

4. The integrated simulation system according to claim 1, wherein
   the processor is configured to
     set a plurality of start timings for the correlated first program and second program, and
     issue commands to the first simulation device and the second simulation device to start the correlated first program and second program at the plurality of set start timings by a single starting operation.

5. The integrated simulation system according to claim 1, wherein
   the processor is configured to
     correlate a plurality of types of parameter settings with the correlated first program and second program, and
     start the correlated first program and second program using the set plurality of types of parameter settings by a single starting operation.

6. The integrated simulation system according to claim 1, wherein the first simulation device or the second simulation device comprises the processor.

7. The integrated simulation system according to claim 1, further comprising an integrated simulation device, which is communicatively connected with the first simulation device and the second simulation device, wherein the integrated simulation device comprises the processor.

8. The integrated simulation system according to claim 1, wherein the first machine is a robot and the second machine is a machine tool.

* * * * *